Oct. 26, 1965  E. C. PROCTER  3,213,597
RECIPROCABLE CUTTER FOR A ROW-CROP HARVESTER
Filed Jan. 7, 1964  2 Sheets-Sheet 1
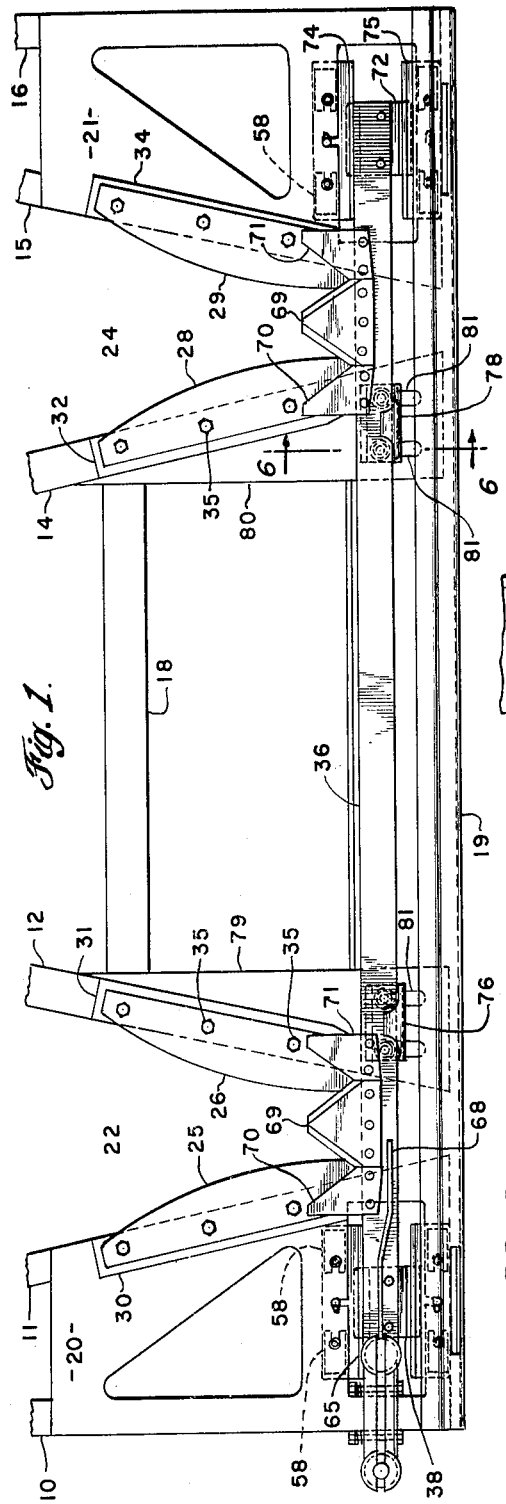
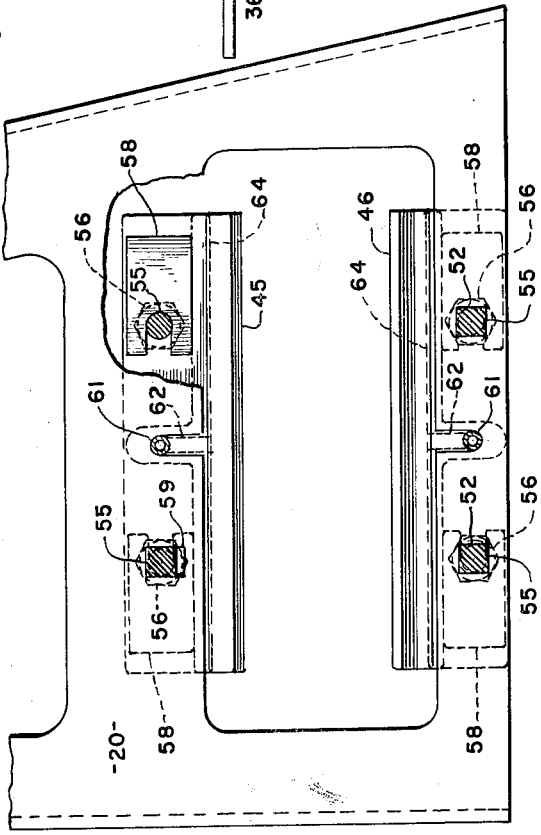
INVENTOR
EDWARD C. PROCTER
BY *Walter V. Wright*
AGENT Oct. 26, 1965  E. C. PROCTER  3,213,597
RECIPROCABLE CUTTER FOR A ROW-CROP HARVESTER
Filed Jan. 7, 1964  2 Sheets-Sheet 2
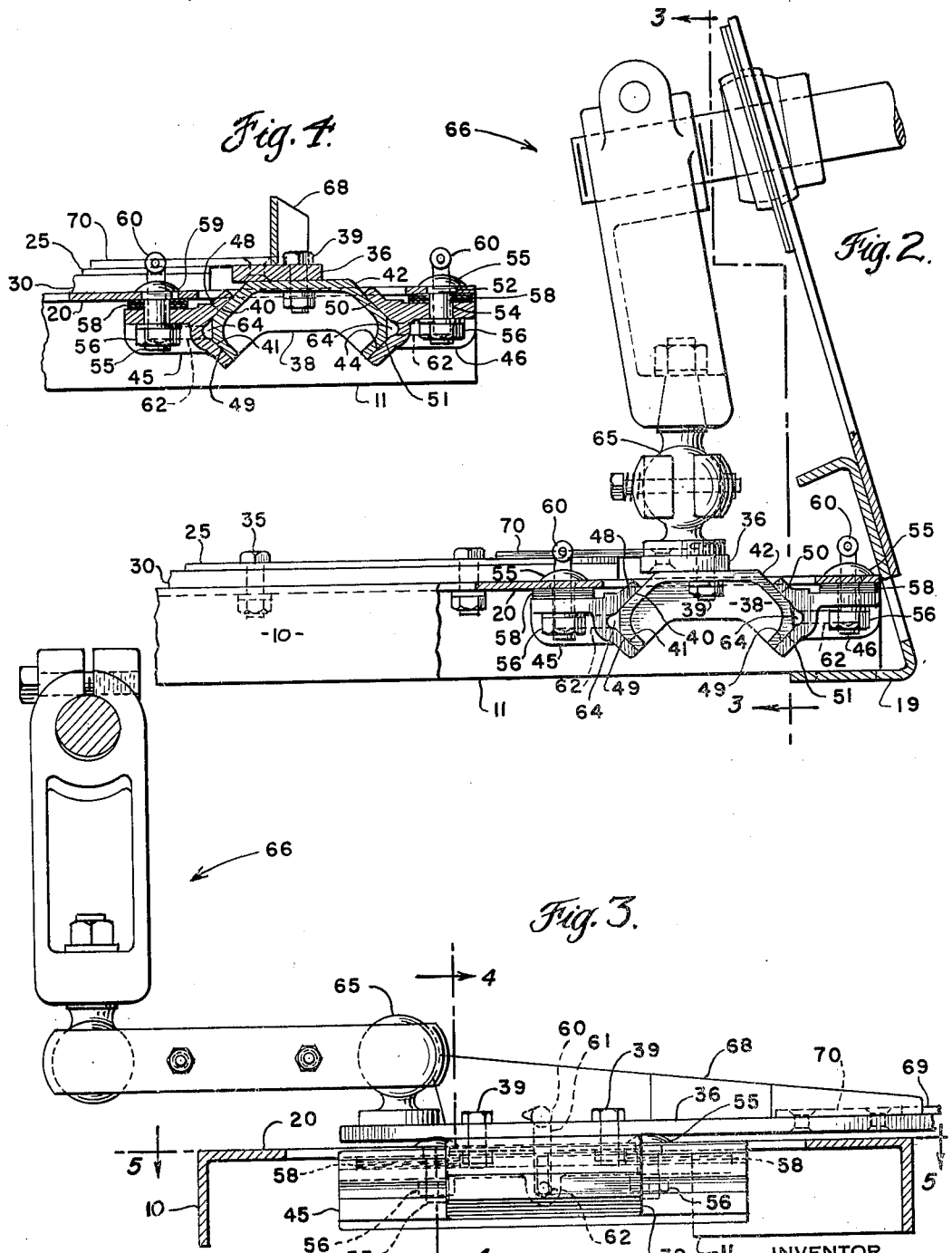
INVENTOR
EDWARD C. PROCTER
BY Walter V. Wright
AGENT

United States Patent Office 3,213,597
Patented Oct. 26, 1965

3,213,597
RECIPROCABLE CUTTER FOR A ROW-CROP HARVESTER
Edward C. Procter, New Holland, Pa., assignor to Sperry Rand Corporation, New Holland, Pa., a corporation of Delaware
Filed Jan. 7, 1964, Ser. No. 336,158
2 Claims. (Cl. 56—16)

This invention relates to reciprocable cutters particularly for row-crop harvesting implements.

Row-crop harvesting implements commonly employ a reciprocable cutting mechanism similar in many respects to the reciprocating mowers used to cut grass-type crops. However, the problems associated with cutting row crops, such as corn, for example, are quite different than those associated with the mowing of grass-type crops. In a mowing machine the cutting mechanism is open and readily accessible for adjustments and repairs. In a row-crop implement the cutting mechanism is covered and is inaccessible for adjustments and repairs. In a mower, the fixed knives are all mounted on a single rigid cutter bar; thus, their shearing edges more or less automatically fall into a common plane. In a row-crop implement, the fixed knife members are each mounted on a separate frame member which is a part of the row-crop header; thus, the fixed knife members are subject to misalignments in the frame of the implement. A grass-type mower is subject to generally uniform loading conditions while a reciprocable row-crop cutting mechanism has several idle, or no load, strokes between each stalk cutting stroke. This produces impact loading conditions on a cutting stroke and inertia and overrunning problems during the idle strokes. Corn stalks and other row crops frequently get bent over at some random angle prior to their being harvested. These "down crops" exert considerable twisting force on the cutting mechanism as a result of their abnormal angle of engagement with the cutting blades. The small stems encountered in a grass type mowing operation do not present this problem.

It is an object of this invention to provide in a row-crop harvesting implement a reciprocable cutter of rugged basic design having a long, low maintenance service life.

It is another object of this invention to provide in a row-crop harvesting implement a reciprocable cutter of light weight construction thereby minimizing the effects of inertia which cause overrunning of the cutter on idle strokes.

It is another object of this invention to provide in a row-crop harvesting implement a reciprocable cutter which may be manufactured and assembled at low cost.

It is another object of this invention to provide in a row-crop harvesting implement a reciprocable cutter which may be easily adjusted to compensate for normal wear.

It is another object of this invention to provide in a row-crop harvesting implement a reciprocable cutter adapted for easy repair and replacement of damaged parts.

These and other objects and advantages of this invention will be apparent upon reference to the following description and claims taken in conjunction with the accompanying drawings wherein:

FIG. 1 is a fragmentary plan view of a row-crop header for a harvesting implement showing a reciprocable cutter constructed in accordance with the principles of the present invention;

FIG. 2 is an end view of the structure shown in FIG. 1 as seen when looking from left to right in FIG. 1, certain parts being broken away to better show the invention;

FIG. 3 is a sectional view taken on the line 3—3 of FIG. 2;

FIG. 4 is a sectional view taken on the line 4—4 of FIG. 3;

FIG. 5 is a sectional view taken on the line 5—5 of FIG 3; and

FIG. 6 is a sectional view taken on the line 6—6 of FIG. 1.

Row-crop headers are generally well known in the art. One example of a single row row-crop header may be seen in U.S. Patent 2,713,240. FIG. 1 of the present drawings shows a portion of a similar header adapted to engage two rows of crops at once. The header has generally fore-and-aft extending frame members 10, 11, 12, 14, 15 and 16 interconnected by transversely extending frame members 18 and 19 and frame plates 20 and 21. The left side portion of the frame, consisting of members 10, 11 and 20, is spaced laterally from the central frame portion, consisting of members 12, 14 and 18. The central frame portion is similarly laterally spaced from the right side portion of the frame, consisting of members 15, 16 and 21. The lateral spacing of the frame portions defines therebetween fore-and-aft extending passages 22 and 24 (FIG. 1) through which standing crops pass rearwardly into the header as it moves forwardly through a field.

A first pair of fixed knife members 25 and 26 are carried respectively by the left side frame portion and the left center frame portion. These knives are disposed on opposite sides of fore-and-aft crop receiving passages 22. An identical pair of fixed knives 28 and 29 are provided along the sides of crop receiving passage 24. It is impractical and unnecessary in manufacturing to attempt to hold the various fore-and-aft frame members 11, 12, 14 and 15 to exacting alignment tolerances, since the primary function of the forwardly projecting frame portions is simply to gather and guide the crops into passages 22 and 24. The fixed knife members 25, 26, 28 and 29, however, are required to lie very closely in a common horizontal plane for proper fulfillment of their crop cutting function. To accomplish this, leveling plates 30, 31, 32 and 34 are provided. After the header frame is assembled, the leveling plates are clamped in a common horizontal plane and then welded to the respective frame parts they overlie. The upper surfaces of the leveling plates then lie substantially in a common horizontal plane. The knives 25, 26, 28 and 29 are fixedly mounted on the leveling plates by bolts 35.

An elongated bar 36 is disposed at the rear ends of the fixed knife members. Bar 36 extends transverse to the direction of travel of the header and projects laterally to the left (FIG. 1) of fixed knife 25. A head member 38 underlies the laterally projecting portion of bar 36 and is attached thereto by bolts 39. Head member 38 is a wide hollow member having a front pair of laterally elongated bearing surfaces 40 and 41 which converge forwardly away from bar 36, and a rear pair of laterally elongated bearing surfaces 42 and 44 which converge rearwardly away from bar 36. Disposed forwardly of head member 38 is a front slide member 45 and disposed rearwardly of head member 38 is an identical rear slide member 46. Front slide member 45 has a pair of laterally elongated rearwardly diverging slide surfaces 48 and 49 slidably engaging, respectively, the forwardly converging bearing surfaces 40 and 41 of head member 38. Rear slide member 46 has a pair of laterally elongated forwardly diverging slide surfaces 50 and 51 slidably engaging, respectively, the rearwardly converging bearing surfaces 42 and 44 of head member 38.

Rear slide member 46 is fixedly mounted on the underside of frame plate member 20 in the following manner: a pair of square holes 52 (see FIG. 5) are formed in plate 20. A pair of apertures 54 (see FIG. 4) are provided in slide member 46. Carriage bolts 55 extend through the aligned apertures 52 and 54 and receive nuts 56 on the underside of the slide member. A plurality of shims 58 are disposed between each end of slide member 46 and the underside of frame plate 20. The shims are employed at the time of initial assembly of the unit merely to position cutter bar 36 in the proper relationship to fixed knives 25, 26, 28 and 29. The shims are not involved in the adjustment of the mechanism to compensate for normal wear.

Front slide member 45 is adjustably mounted on the underside of frame plate 20 in the same manner as rear slide member 46 with the single exception that frame plate 20 is provided with fore-and-aft elongated slots 59 (see FIG. 5) in place of the square holes 52 for the rear slide member. As will be apparent in the U.S. patent referred to above, the only path of ready accessibility to the cutting mechanism for adjusting it is from below. With the mechanism just described, when the head 38 and the slide members 45 and 46 wear sufficiently to produce looseness of the head in the slide members, the operator simply loosens the nuts 56 on the underside of front slide member 45 and taps the front slide member rearwardly toward rear slide member 46 to take out the looseness. He then tightens nuts 56 again to clamp front slide member 45 in its new position. The entire adjustment is quickly and easily performed from below the header with only one wrench and without manipulating shims.

Each of the slide members 45 and 46 carries a conventional right angle grease fitting 60. Ports 61 and 62 (see FIG. 5) lead from the grease fitting through the slide members to a laterally extending grease channel 64 in each of the slide members at the vertex of the diverging slide surfaces (see FIG. 4). A ball member 65 is carried atop bar 36 at the left end thereof as seen in FIG. 1 for purposes of driving the cutting assembly by conventional mechanism such as is indicated, generally, by the numeral 66 in FIGS. 2 and 3. A vertical gusset plate 68 is welded atop bar 36 at driving ball 65. Plate 68 overlies the driving head 38 and extends laterally along bar 36 beyond driving head 38 to the area of crop receiving passage 22 (FIG. 1). A conventional row-crop double-edged knife member 69 is fixedly attached to bar 36 and disposed between fixed knife members 25 and 26. Mounted on bar 36 on either side the knife member 69 is an unsharpened half knife member, or cleaner, 70 and 71. As bar 36 is reciprocated in the conventional manner, the side cutting edges of knife member 69 coact alternately with fixed knife members 25 and 26 to sever crops moving relatively rearwardly through passage 22. The cleaner members 70 and 71 sweep laterally over knife members 25 and 26, respectively, to prevent crop material from building up on the knife members.

At the opposite end of bar 36 from the driving head a head member 72 (FIG. 1), identical to driving head 38, is carried. Its slide members 74 and 75 are identical to the front and rear slide members 45 and 46 at the driving end of bar 36. In the case of a two-row machine as shown in FIG. 1, additional clip members 76 and 78 are mounted on the inboard sides of fixed knife members 26 and 28. These clips are carried on frame plate members 79 and 80 as may be seen in FIG. 1. The clips 76 and 78 prevent bar 36 from bowing upwardly out of its normal horizontal plane of reciprocation during operation. The two clips are identical, and the details thereof are best seen in FIG. 6. The clips are carried in fore-and-aft elongated slots 81 in frame plate members 80 and 79. The clips are comprised of a J-shaped plate member (marked 78 in FIG. 6), the underside of which has studs 82 welded thereto. A washer and bolt 83 threads on each of the studs 82 of each of the clip members 76 and 78 thereby fixedly clamping the clip members to the frame plate members 79 and 80 respectively. By virtue of the elongated slots 81 through which studs 82 extend, the clip members 76 and 78 may be loosened and moved rearwardly clear of bar 36 for removal from the implement without removing bar 36. As in the case of head members 38 and 72, adjustment of clip members 76 and 78 may be readily performed from underneath the machine using only a single wrench. In the case of a single row row-crop header, the sickle bar 36 would be considerably shorter than that shown in FIG. 1 and the clip members 76 and 78 would not be employed.

The reciprocable cutter of this invention provides maximum ruggedness in a structure of minimum weight and cost. The wide fore-and-aft spacing between the front and rear slide members at each end of the cutter bar provides excellent stability against twisting of the cutter bar and knife members upwardly or downwardly about the axis of the cutter bar 36. Adjustments to compensate for normal wear are quickly and easily performed, as is removal and replacement of the entire cutting unit if such is required.

An additional feature of this mechanism is that the cutter bar 36, its knife members and cleaners 69, 70 and 71 and its driving ball 65 may readily be removed as a unit without disturbing the head members 38 and 72 in their respective slide members 45, 46 and 74, 75. This is accomplished simply by removing the four bolts 39 which connect the heads 38 and 72 to bar 36. The bar 36 and the other parts carried thereon may then be pulled laterally from the unit. A new bar 36, or the reworked old bar 36 can be re-installed without any adjustment of the slide members or heads.

While this invention has been described in connection with a particular embodiment thereof, it will be understood that it is capable of modification, and this application is intended to cover any variations, uses, or adaptations including such departures from the present disclosure as come within known or customary practice in the art to which the invention pertains, and as fall within the scope of the invention or the limits of the appended claims.

Having thus described my invention what I claim is:

1. In a row crop harvester implement having frame portions spaced apart laterally to define therebetween a fore-and-aft extending passage through which crops pass as said implement moves forwardly through a field, a reciprocable cutter comprising a first pair of knife members, means fixedly mounting said knife members, respectively, on said frame portions on opposite sides of said passage and in a common generally horizontal plane, an elongated bar disposed adjacent the rear ends of said first pair of knife members and extending transverse to the direction of travel of said implement, said bar projecting laterally beyond said pair of fixed knife members, a head member, means removably attaching said head member to the laterally projecting portion of said bar, said head member having a front pair of laterally elongated bearing surfaces disposed forwardly of said bar and a rear pair of laterally elongated bearing surfaces disposed rearwardly of said bar, said rear pair of surfaces converging rearwardly away from said bar, said front pair of surfaces converging forwardly away from said bar, a front slide member disposed forwardly of said head member and on the under side of said frame, said front slide member having a pair of laterally elongated rearwardly diverging slide surfaces slidably engaging, respectively, the forwardly converging front pair of bearing surfaces on said head member, a rear slide member disposed rearwardly of said head member and on the underside of said frame, said rear slide member having a pair of laterally elongated forwardly diverging slide surfaces slidably engaging, respectively, the rearwardly converging rear pair of bearing surfaces on said head member, said rear slide member and said frame having aligned apertures therein and bolt means extending through said aligned apertures fixedly mounting said rear slide member on said frame, said front slide member having slots therein elongated in the fore-and-aft direction, said frame having apertures vertically aligned with said slots and bolt means extending through said apertures and slots adjustably mounting said front slide member on said frame for adjustment toward and away from said rear slide member, a first series of shims disposed between said rear slide member and said frame, a second series of shims disposed between said front slide member and said frame, a knife member fixedly attached to said bar and disposed between said first pair of knife members substantially in said horizontal plane common to said first pair of knife members, and means connected to said head member to slidably reciprocate the head member in said slide members to thereby reciprocate said bar and the knife member attached thereto laterally back and forth across said passage and between said first pair of knife members to sever crops passing through said passage.

2. In a row crop harvester implement having frame portions spaced apart laterally to define therebetween a fore-and-aft extending passage through which crops pass as said implement moves forwardly through a field, a reciprocable cutter comprising a first pair of knife members, means fixedly mounting said knife members, respectively, on said frame portions on opposite sides of said passage and in a common generally horizontal plane, an elongated bar disposed adjacent the rear ends of said first pair of knife members and extending transverse to the direction of travel of said implement, said bar projecting laterally beyond said pair of fixed knife members, a head member underlying said bar, a plurality of bolts removably attaching said head member to the laterally projecting portion of said bar, said head member having a front pair of laterally elongated bearing surfaces disposed forwardly of said bar and a rear pair of laterally elongated bearing surfaces disposed rearwardly of said bar, said front pair of surfaces converging forwardly away from said bar, said rear pair of surfaces converging rearwardly away from said bar, a front slide member disposed forwardly of said head member, said front slide member having a pair of laterally elongated rearwardly diverging slide surfaces slidably engaging, respectively, the forwardly converging front pair of bearing surfaces on said head member, a rear slide member disposed rearwardly of said head member, said rear slide member having a pair of laterally elongated forwardly diverging slide surfaces slidably engaging, respectively, the rearwardly converging rear pair of bearing surfaces on said head member, means fixedly mounting said rear slide member on said frame, means adjustably mounting said front slide member on said frame for adjustment toward and away from said rear slide member, a knife member fixedly attached to said bar and disposed between said first pair of knife members substantially in said horizontal plane common to said first pair of knife members, a vertically extending gusset fixedly attached to said bar and overlying said head member, said gusset extending laterally along said bar from said head member to the knife member fixedly attached to said bar, and means connected to said head member to slidably reciprocate the head member in said slide surfaces of said slide members to thereby reciprocate said bar and the knife member attached thereto laterally back and forth across said passage and between said first pair of knife members to sever crops passing through said passage.

References Cited by the Examiner
UNITED STATES PATENTS

| | | | |
|---|---|---|---|
| 1,158,500 | 11/15 | Hopkins | 56—305 |
| 1,832,936 | 11/31 | Kowalsky | 56—102 |
| 2,177,911 | 10/39 | Sommerfield | 56—16 |
| 3,044,242 | 7/62 | Procter | 56—304 |

ABRAHAM G. STONE, *Primary Examiner.*

ANTONIO F. GUIDA, *Examiner.*